United States Patent [19]
Durnin et al.

[11] Patent Number: 4,852,973
[45] Date of Patent: Aug. 1, 1989

[54] DIFFRACTION FREE ARRANGEMENT

[75] Inventors: James E. Durnin; Joseph H. Eberly, both of Rochester, N.Y.

[73] Assignee: Research Corporation, New York, N.Y.

[21] Appl. No.: 915,187

[22] Filed: Oct. 3, 1986

[51] Int. Cl.$^4$ ............ G02B 5/18; G10K 11/32; H05H 3/02; G21G 4/00

[52] U.S. Cl. .................. 350/162.11; 181/142; 181/176; 250/493.1; 372/103

[58] Field of Search ............... 350/163, 162.11, 162.2, 350/448, 162.16; 250/493.1; 356/363, 400, 401; 372/103; 181/142, 176

[56] References Cited

U.S. PATENT DOCUMENTS 3,230,475  1/1966  Koester et al. ............... 350/163
4,185,254  1/1980  Hall et al. .

OTHER PUBLICATIONS

J. M. Stone, Radiation and Optics, published 1963–McGraw-Hill (New York), see p. 132 and FIGS. 7–16.
Goodman, J. W., *Introduction to Fourier Optics*, McGraw Hill, N.Y., 1968.
Wellford, W. T., "Use of Annular Apertures to Increase Focal Depth," Aug. 1960, JOSA, vol. 50, No. 8, pp. 749–753.
"Ultrasonic Transducer Design for Unfiorm Insonation in Biomedical Ultrasound", G. H. Garrison & E. K. Balcer-Kubiczek, 1985 *Ultrasonics Symposium,* pp. 630–633.
"Experimental Demonstration of Fourier Synthesis of an Annular Ultrasonic Intensity Distribution", G. H. Harrison & E. K. Balcer-Kubiczek.
"Annular and Sector Phased Array Applicators for Ultrasound Hypothermia", C. A. Cain & S. I. Umemura, 1985 *Ultrasonics Symposium,* pp. 936–941.
"Single–Transducer Electrode Design for Beam Shaping in Biomedical Ultrasound", G. H. Harrison & E. K.

Balcer-Kubiczek, *IEEE Transactions on Ultrasonics, Ferroelectrics & Frequency Control,* vol. UFFC-33, No. 3, May 1986, pp. 265–272.
"Accoustical Imaging Techniques applied to General Transducer Design", G. H. Harrison, E. Balcer-Kubiczek & D. McCulloh, *Acoustical Imaging,* vol. 13 (1984).

*Primary Examiner*—Bruce Y. Arnold
*Attorney, Agent, or Firm*—Scully, Scott, Murphy & Presser

[57] ABSTRACT

Arrangements are disclosed for generating a well defined traveling wave beam substantially unaffected by diffractive spreading. In different embodiments, the beam can be an electromagnetic wave, particle beam, a transverse beam, a longitudinal beam such as an acoustic beam, or any type of beam to which the Helmholtz generalized wave equation is applicable. Pursuant to the teachings herein, a beam is generated having a transverse dependence of a Bessel function, and a longitudinal dependence which is entirely in phaser form, which results in a beam having a substantial depth of field which is substantially unaffected by diffractive spreading. In first and second disclosed embodiments respectively, optical and acoustical beams are generated by placing a circular annular source of the beam in the focal plane of a focusing means, which results in the generation of a well defined beam thereby because the far field intensity pattern of an object is the Fourier transform thereof, and the Fourier transform of a Bessel function is a circular function. In a third disclosed embodiment, a microwave beam is generated by transmitting a coherent microwave beam sequentially through a phase modulator, having a periodic step function pattern, and a spatial filter, whose transmittance is the modulus of the Bessel function, to generate a microwave beam having a transverse Bessel function profile.

15 Claims, 13 Drawing Sheets

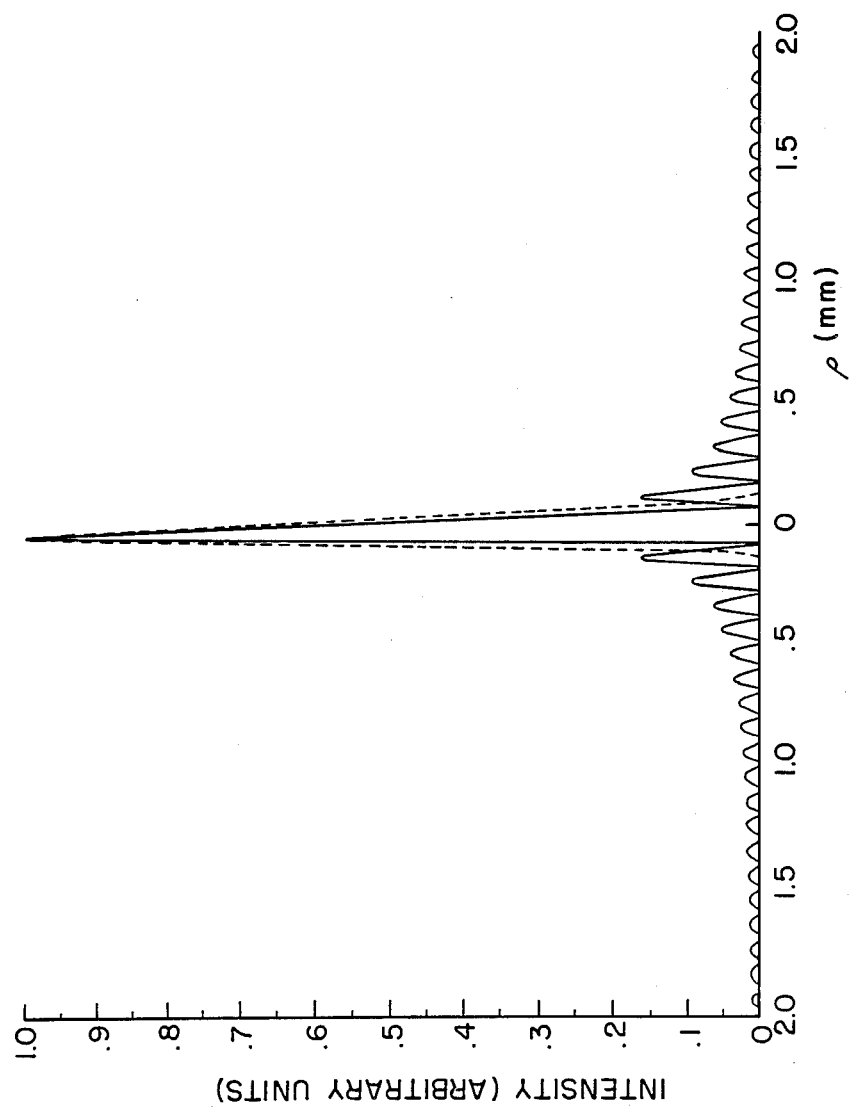

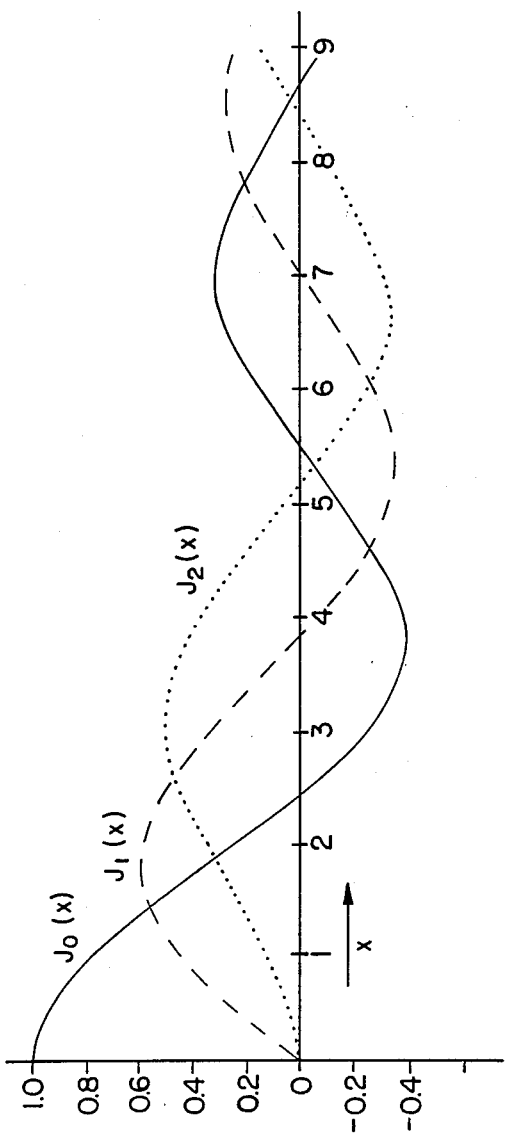
FIG. 12 THE BESSEL FUNCTIONS $J_0(x)$, $J_1(x)$, AND $J_2(x)$

DIFFRACTION FREE ARRANGEMENT

BACKGROUND OF THE INVENTION

1. Field of the Invention

The present invention relates generally to novel arrangements, including both systems and methods, for generating narrow beams of traveling wave fields in space.

The teachings of the present invention are applicable to all types of waves as described by the basic Helmholtz wave equation, including electromagnetic waves such as radio frequency, microwave, infra-red, optical and x-ray waves, relativistic and nonrelativistic quantum waves associated with particle waves, such as electron, neutron, proton, atom and other quantum particle waves, and further including physical elastic waves such as transverse waves and longitudinal waves including acoustical waves.

2. Discussion of the Prior Art

Current state of the art techniques to concentrate a wave or form a parallel beam are generally successful only over a very limited range of beam propagation. This range is conventionally related inversely to the degree of concentration. This inverse relationship arises primarily because all wave fields are subject to diffraction (i.e., beam spreading).

The arrangement of the subject invention has several advantages over all prior art techniques currently in use, with a principle advantage thereof being greatly improved resistance to diffraction.

Two methods exist in the current state of the art for generating narrow beams, focusing and collimation. Due to the ever present effects of diffraction, a focus is never perfect. Instead, a focus is characterized as a finite region over which a beam has a minimum radius. The distance along the lens axis, on one side or the other of the focus, where the beam exhibits significant convergence is called the depth of field of the focus. The depth of field of a focus is generally limited by the sharpness of the focus. That is, a very small focal spot can be achieved only at the expense of depth of field.

All light waves, such as those radiated by the sun, lamps and lasers, can be collimated as well as focused. Collimated (parallel) beams are generally preferred because they have much greater depth of field than focused beams, although they are less bright. Collimation is normally accomplished by a series of aligned apertures, which are basically just holes in opaque screens, which allow the light through along just one direction. A sequence of aligned holes along a collimation axis of a beam provides the normal manner of creating a well-defined parallel or collimated beam.

Unfortunately, diffraction affects collimation adversely just as it does focusing. The effects of diffraction on collimation can be described with the explanation that a wave field bends outwardly from the edges of a hole as it proceeds therethrough, and thus the resulting beam is not as well collimated. FIG. 1 illustrates the characteristic behavior of waves traveling through holes. The diffractive bending of water waves that are entering a narrow harbor or passing by a jetty can be shown easily in aerial photographs thereof because of the large scales involved, but the bending of light waves is very difficult to notice under ordinary circumstances because the angle of bending is so small. The bending angle is approximately equal to the ratio of the wavelength of the light to the size of the hole, an angle that is usually less than $10^{-3}$ (one one-thousandth) of a degree. A standard criterion called the "Rayleigh range" idendifies the distance over which a collimated beam remains well defined after passing through a hole with a given cross sectional area. The Rayleigh range is the ratio of the area of the hole to the wavelength of the light. The Rayleigh range (here denoted Z) is mathematically characterized by the formula $Z=A/\lambda$, where A denotes the hole's area and $\lambda$ denotes the light's wavelength. For visible light $\lambda$ is very small, in the range 15–30 millionths of an inch. A circular hole with a radius equal to one inch has a Rayleigh range of about $Z=2$ miles. For this reason the diffraction illustrated in FIG. 1 will ordinarily be simply undetectable.

However, if an attempt is made to define the beam extremely well (to be able to illuminate a very small spot quite precisely) then the situation is very different. A spot radius of 50 microns (about two-thousandths of an inch) or smaller is conceivable in applications of modern optical technology. The Rayleigh range for a beam formed by passage through a 50 micron sized hole is only one inch or less. This is much greater than the depth of field of a normal sized lens focal spot, but is still very small on a practical working scale.

These estimates indicate that current techniques for creating narrow collimated beams are simply unable to generate beams that have any significant range at all, particularly with respect to commercial operations such as drilling, embossing, scribing, testing, and other manufacturing or laboratory activities that might advantageously use very narrow beams.

SUMMARY OF THE INVENTION

The present invention overcomes the prior art limitations on the range of extremely well defined beams, with the term beam herein being utilized generally to refer to the central bright spot, not the full intensity pattern, and is based on the premise that wave fields are subject to the laws of diffraction. The subject invention can be explained as an arrangement for causing diffractive influences on a beam to cancel each other, thereby allowing the preparation of narrow beams with extreme range or depth of field.

To be specific, reconsider the last example hereinabove of a 50 micron beam. If a diffraction free aperture as described herein, with a radius of one inch, instead of 50 microns, is used to create a 50 micron size beam, the Rayleigh range becomes 500 times greater, about 33 feet. If narrow beams are important for truly distant wave transport, as in reconnaissance and laser rangefinding, a somewhat larger diffraction free aperture would suffice. For example, if a diffraction free aperture with a one-foot radius is used, to create a one-inch wide beam, the Rayleigh range grows to miles.

Accordingly, a principal object of the present invention is to provide an arrangement for transforming travelling wave fields into well-defined beams that are not affected by diffractive spreading. The arrangement depends upon a properly designed aperture, can be applied to any wave field whose wave amplitude $\Psi$ satisfies these mathematical relations:

$$\Psi(x,y,z,t)=\Psi(x,y,z)e^{-i\omega t}$$

$$[\nabla^2+(\omega/v)^2]\psi(x,y,z,t)=0$$

The letter v designates the velocity of the wave incident on the transmission plate.

It is well known that an extremely wide variety of wave fields satisfy these conditions, including radio, microwave, infra-red, optical, x-ray, and all other electromagnetic waves, many types of sound, water, and elastic waves, and both relativistic and non-relativistic quantum waves associated with electrons, neutrons, protons, atoms and all other quantum particles.

Considering, for illustration, only light waves, the beams generating pursuant to the teachings herein can find immediate application to laser printing, laser surgery, laster etching, and other laser applications where depth of field and control of beam definition are more crucial than the irradiance thereof. Ranging and signalling and targeting with well defined, high power coherent electromagnetic and other waves over long distances may also be possible in nonabsorbing media and atmospheres.

Pursuant to the teachings herein, nondiffracting apertures can be constructed by following precise criteria which are based upon mathematical principles of waves. The basic criterion of a nondiffracting aperture is to convert a wavefront of an input plane wave beam, obtained in a standard manner, from a laser beam for example, into a wavefront with a very specific form, so that the height and spacing of the modulations of the output electric field strength of the output beam are related to each other in such a way that the beam travels without any change in the modulations. This means that any very sharp maximum, such as the central beam spot, will maintain its small size and will not spread out. Nondiffracting apertures can be built to satisfy these criteria by using commercially available components such as lenses, screens, wave guides, masks, absorption filters, phase shifters, etc.

The term nondiffracting as used herein is meant to apply to a well defined traveling wave beam not subject to beam spreading in the sense that the intensity pattern of the traveling wave beam in a transverse plane is substantially unaltered by propagation over a range which is substantially larger than the Rayleigh range of a Gaussian beam with equal central spot width. Pursuant to the teachings of the present invention, such a wave beam is formed by generating a traveling wave beam the amplitude of which has its transverse dependence substantially identical to $J_m(\alpha\rho)$, the $m^{th}$ Bessel function of the first kind, wherein $\alpha$ is a geometrical constant and $\rho$ designates the transverse radial coordinate of the wave beam, and further wherein the Bessel function argument is independent of the distance z of propagation, which results in a well defined travelling wave beam not subject to beam spreading.

Pursuant to the teachings of the present invention, a well defined traveling wave beam substantially unaffected by diffractive spreading can be generated from a recognition that certan exact, non-singular solutions exist for the free space Helmholtz wave equation which represent a class of fields that are nondiffracting in the sense that the intensity pattern in a transverse plane is substantially unaltered by propagation in free space. More specifically, the present invention recognizes that the only axially symmetric nondiffracting field other than a plane wave is the zero-order Bessel function of the first kind, and this beam can have an effective spatial width as small as several wavelengths.

In accordance with the teachings herein, the present invention provides arrangements, encompassing both systems and methods, for generating a well defined traveling wave beam substantially unaffected by diffractive spreading, comprising generating a beam having a transverse dependence of a Bessel function, and a longitudinal dependence which is entirely in phaser form, which results in a beam having a substantial depth of field which is substantially unaffected by diffractive spreading. In one disclosed embodiment, the beam is generated by placing a circular annular source of the beam in the focal plane of a focusing means, which results in the generation of a well defined beam thereby because the far field intensity pattern of an object is the Fourier transform thereof, and the two-dimensional Fourier transform of a Bessel function is a circular function. In a second disclosed embodiment, the beam is generated by transmitting a coherent beam sequentially through a phase modulator, having a periodic step function pattern, and a spatial filter, whose transmittance is the modulus of the Bessel function, to generate a beam having a transverse Bessel function profile.

In different embodiments, the beam can be an electromagnetic wave, a particle beam, a transverse beam, a longitudinal beam such as an acoustic beam, or any type of beam to which the Helmholtz generalized wave equation is applicable.

Moreover, the beam can be generated with a transverse dependence of a zero order Bessel function, or a higher order Bessel function, or any combination of different Bessel functions such as a zero order Bessel function and one or more higher order Bessel functions as illustrated in FIG. 12.

The present invention offers a significant advantage over prior art methods by permitting a bright central core of a beam to remain concentrated and available for use over much greater ranges of propagation than is currently possible with prior art methods of beam formation. The subject invention is generally applicable to processes that are activated by bright spots (of light, for example), but for which the distance at which the activity occurs is not easily controlled extemely well. These processes can vary from normal manufacturing and laboratory processes such as drilling, embossing, scribing, welding or testing, where the distance is in the few-inch range and beam spot sizes may be extremely small (10-100 microns), to open field processes such as ranging and aligning where the distances and beam spot sizes may both be many thousands of times greater, but relative tolerances about the same.

BRIEF DESCRIPTION OF THE DRAWINGS

The foregoing objects and advantages of the present invention for a diffraction free arrangement may be more easily understood by one skilled in the art with reference being had to the following detailed description of several preferred embodiments thereof, taken in conjunction with the accompanying drawings wherein like elements are designated by identical reference numerals throughout the several views, and in which:

In FIGS. 4a through 4d, the solid line represents the intensity distribution for a $J_o$ beam and the dotted line represents that of a Gaussian beam, in FIG. 4a when z=0 (i.e., in the initial plane where the beams are formed), in FIG. 4b after propagating a distance z=25 cm., in FIG. 4c after propagating a distance z=50 cm., and in FIG. 4d after propagating a distance z=80 cm., with λ=0.5 μm. In FIGS. 4b-d, the intensity of the Gaussian beam has been multiplied by 10 to make it visibly discernible;

FIG. 12 illustrates graphs of known Bessel functions $J_0(x)$, $J_1(x)$, and $J_2(x)$.

DETAILED DESCRIPTION OF THE DRAWINGS

Figure 1:
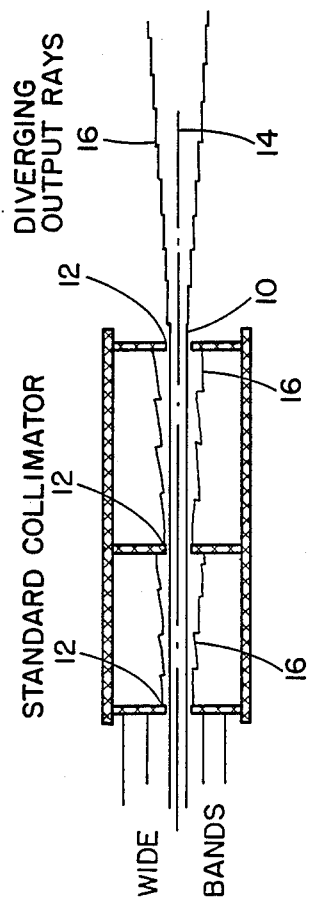
FIG. 1 is a schematic view of an exemplary prior art collimator, and illustrates the effects of diffraction therein.

Referring to the drawings in detail, FIG. 1 is a schematic view of a typical prior art collimator, illustrating a substantially collimated beam 10 after it has passed through three successive apertures 12 positioned in alignment along a collimation axis 14. Specifically, FIG. 1 illustrates an exaggerated view of the effects of diffraction on the beam at 16 after the beam passes through each aperture.

Figure 2:
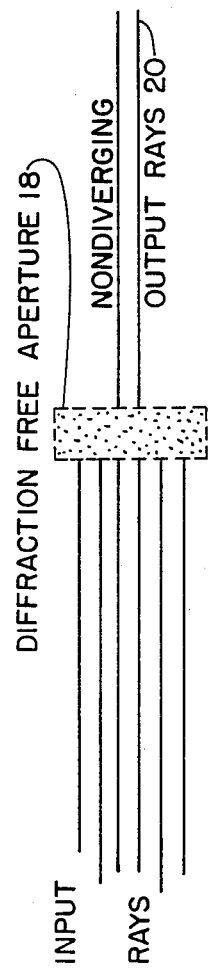
FIG. 2 illustrates a schematic view of a nondiverging output beam produced by embodiments of diffraction free apertures constructed pursuant to the teachings of the present invention.

In contrast to FIG. 1, FIG. 2 is a schematic illustration of a diffraction free aperture 18 constructed pursuant to the teachings herein, and illustrates the non-diverging output beam 20 produced thereby.

Pursuant to the teachings of the present invention, a well defined traveling wave beam 20 substantially unaffected by diffractive spreading can be generated from a recognition that certain exact, non-singular solutions exist for the free space Helmholtz wave equation which represent a class of fields that are nondiffracting in the sense that the intensity pattern in a transverse plane is substantially unaltered by propagation in free space. More specifically, the only axially symmetric non-diffracting field other than a plane wave is the zero-order Bessel function of the first kind, and this beam can have an effective spatial width as small as several wavelengths. Several arrangements are disclosed herein for approximately generating $J_o$ beams, and a numerical simulation of their propagation is presented which demonstrates that they possess a remarkable depth of field.

It is characteristic of the familiar wave equations of theoretical physics that they reduce to the Helmholtz equation $$[\nabla^2 + \kappa^2]\vec{\Psi}(\vec{r}) = 0 \tag{1}$$

when the time-dependence is separable. This is true, for example, of the Klein-Gordon equation, the Schrodinger equation, and various classical equations for light, sound, water, and other types of waves.

A recognized feature of all previously known solutions to equation (1) is that whenever the field Ψ is initially confined to a finite area of radius r in a transverse plane, it will be subject to diffractive spreading after propagating a distance $z \gg \kappa r^2$ normal to that plane in free space. For this reason, it is commonly thought that any beam-like field (i.e., one whose intensity is maximal along the axis of propagation and tends to zero with increasing transverse coordinate) must eventually undergo diffractive spreading as it propagates. This is certainly true, for example, of Gaussian beams—a Gaussian beam having spot size σ, the root mean square width at beam waist, will diverge at an angle inversely proportional to κσ at distances $z \gg \kappa\sigma^2$ from the beam waist.

We present here free-space, beam-like, exact solutions of the wave equation (any of the wave equations mentioned above) that are not subject to transverse spreading (diffraction) after the plane aperture where the beam is formed. These solutions are regular and well behaved mathematical functions with finite vaues at all points and, like plane waves, have finite energy density rather than finite energy. Most importantly, they can have intensity distributions as small as several wavelengths in every transverse plane, independent of propagation distance.

Consider the electromagnetic wave equation as a particular example. In this case Ψ represents the complex amplitude of one component of a monochromatic electric field assumed to be polarized normal to the direction of propagating. One can easily verify that for time dependence $e^{-i\omega t}$ an exact solution of equation (1) for fields propagating into the source-free region $z \geq 0$ is $$\Psi(x,y,z \geq 0) = e^{i\beta z}\Psi(x,y,z=0), \tag{2}$$

with the amplitude in the z=0 plane being equal to $$\Psi(x,y,z=0) = \int_0^{2\pi} A(\phi) e^{i\alpha[x\cos(\phi)+y\sin(\phi)]} d\phi. \tag{3}$$

Here $A(\phi)$ is an arbitrary complex function of β, and $\beta = [\kappa^2 - \alpha^2]^{1/2}$.

The separable z-dependence in equation (2) is the critical property which the present invention recognizes is characteristic of non-diffracting solutions. Note that when β is real it gives immediately $|\Psi(x,y,z \geq 0)| = |\Psi(x,y,z=0)|$. The transverse structure in the z=0 plane is reproduced exactly in every other plane for z>0, and this recognition presents some remarkable consequences.

The real time-dependent field associated with the complex amplitude Ψ is $$E(\vec{r},t) = \frac{1}{2}\Psi(\vec{r})e^{-i\omega t} + c.c., \tag{4}$$

where c.c. denotes complex conjugate, ω=cκ, and c is the speed of light. The time-averaged intensity of this field is simply $$\vec{I(r)} = \lim_{T\to\infty} \int_0^T E^2(\vec{r},t)\frac{dt}{T} \qquad (5)$$
$$= \frac{1}{2}|\psi(\vec{r})|^2.$$

For any value of $\alpha$ in the interval $0 \leq \alpha \leq \kappa$, a field of the form given in equation (2) will be nondiffracting in the sense that the intensity pattern in the $z=0$ plane is reproduced in every plane normal to the z-axis:

$$I(x,y,z \geq 0) = I(x,y,z=0). \qquad (6)$$

For values of $\alpha > \kappa$, the solutions are evanescent waves whose intensities decrease exponentially along the z axis.

By superimposing monochromatic non-diffractive fields of amplitude $V_m$ and frequency $\omega_m = c[\beta_m^2 + \alpha^2]^{1/2} \geq c\alpha$ one obtains a polychromatic solution of the wave equation $$E(\vec{r},t) = \frac{1}{2}\psi(x,y,z=0)\sum_m V_m e^{i[\beta_m z - \omega_m t]} + c.c., \qquad (7)$$

for which the time-averaged intensity is $$I(x,y,z \geq 0) = \left[\frac{1}{2}\sum_m |V_m|^2\right]|\psi(x,y,z=0)|^2. \qquad (8)$$

Thus a field need not be monochromatic in order to be nondiffracting in the sense that we have defined. It is only necessary that all of the frequencies exceed the value $\alpha c$ when $\Psi$ is of the form given in (3).

The only axially symmetric non-diffracting fields are those for which the function $A(\phi)$ is independent of $\phi$, namely, those fields whose amplitudes are proportional to $$\psi(\rho,z=0) = \int_0^{2\pi} e^{i\alpha[x\cos(\phi)+y\sin(\phi)]}\frac{d\phi}{2\pi} \qquad (9)$$
$$= J_0(\alpha\rho).$$

Figure 3:
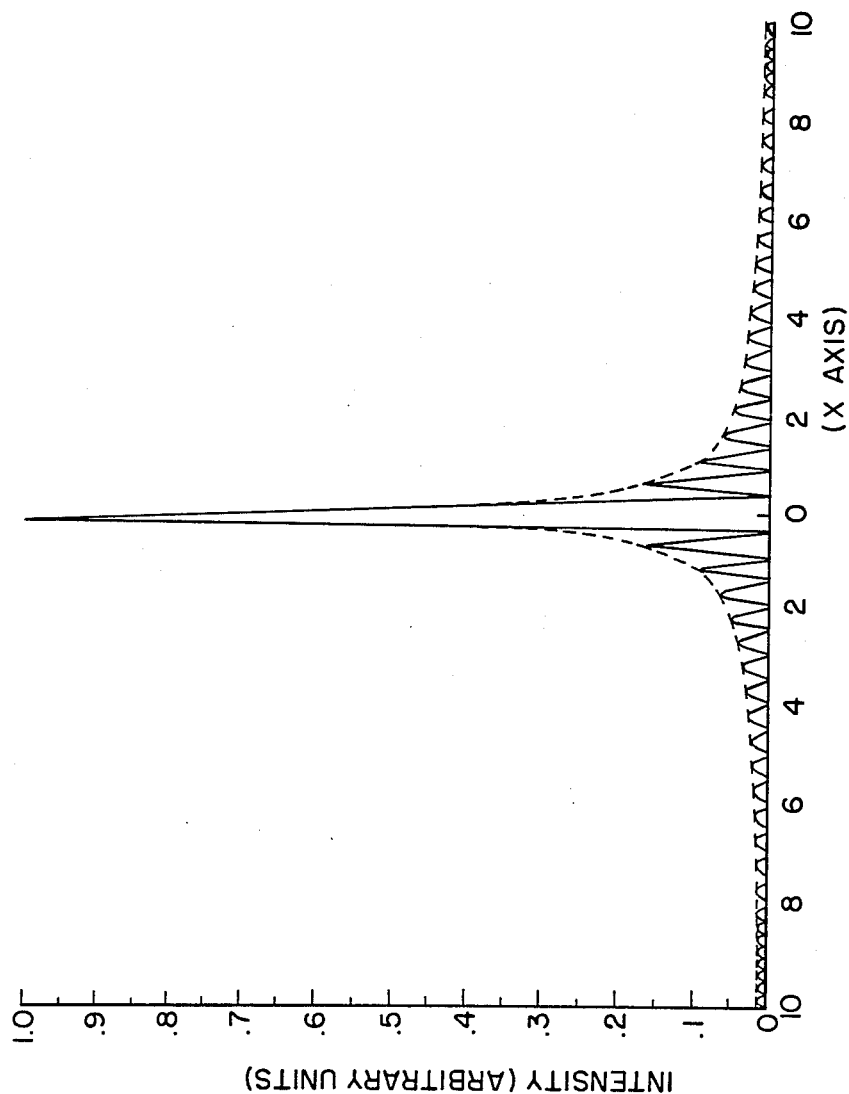
FIG. 3 illustrates a Bessel function intensity distribution wherein the solid line represents $J_0^2(x)$, and the dotted line envelope represents $2/\pi x$.

Here $\rho^2 x^2 + y^2$ and $J_0$ is the zero-order Bessel function of the first kind. When $\alpha=0$ the solution is simply a plane wave, but for $\alpha>0$ we have an intensity distribution whose envelope is inversly proportional to $\alpha\rho$, as shown in FIG. 3. The effective width of the beam is governed by $\alpha$ and when $\alpha$ equals the maximum possible value $\kappa=2\pi/\lambda$ for a non-evanescent field, the central maximum has a diameter of approximately $3\lambda/4$.

It is easily shown that none of the nondiffracting field solutions given by equation (3) are square-integrable, but the equations and solutions are idealizations applying to infinite, empty space, and thus an infinite amount of power would be required to create a spatial mode of that form over an infinite space, and we will now examine the propagation properties of $J_o$ beams of finite aperture.

Figure 4B:
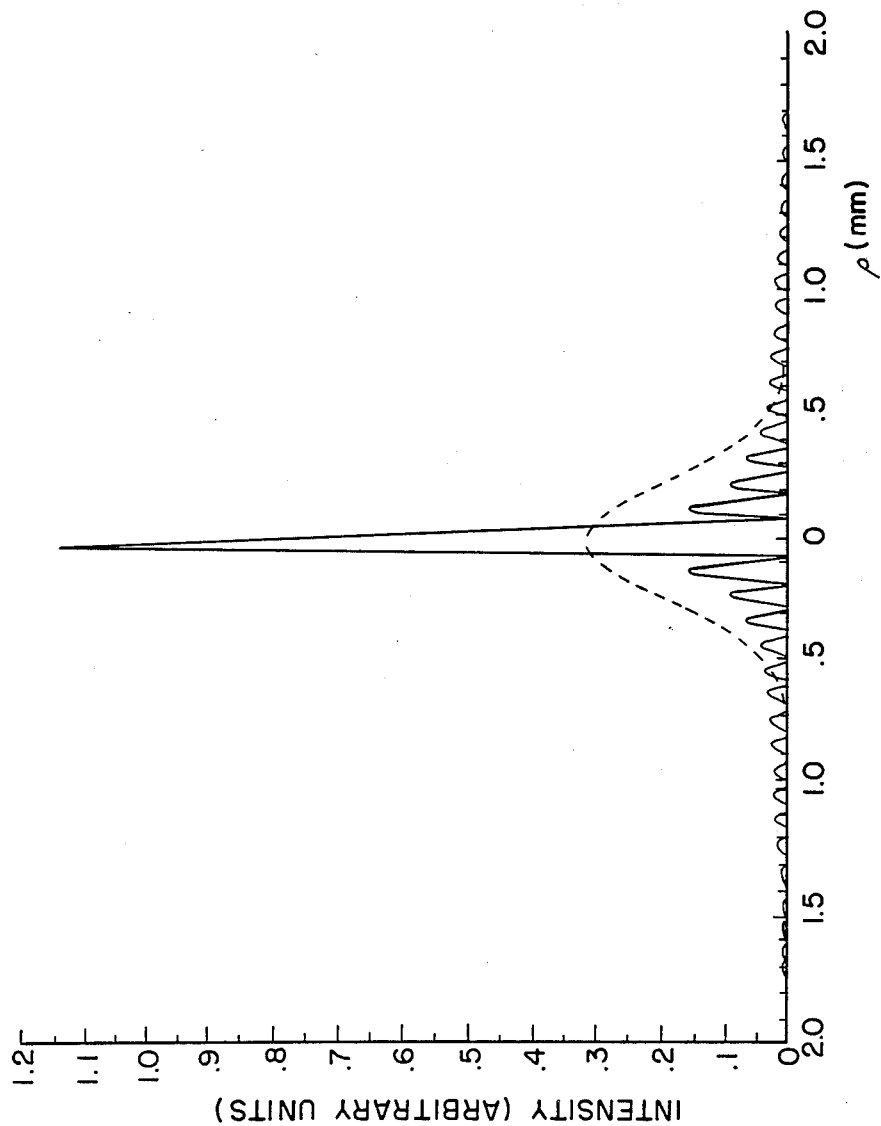
Figure 4C:
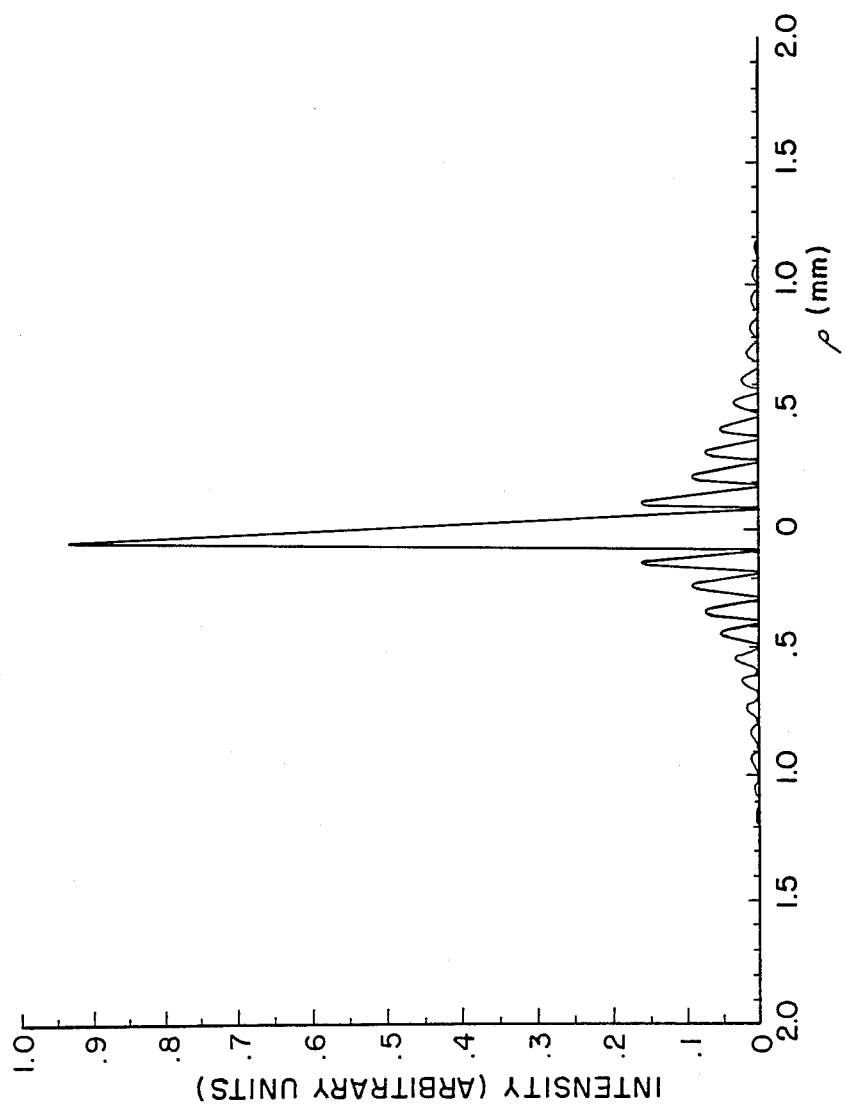
Figure 4D:
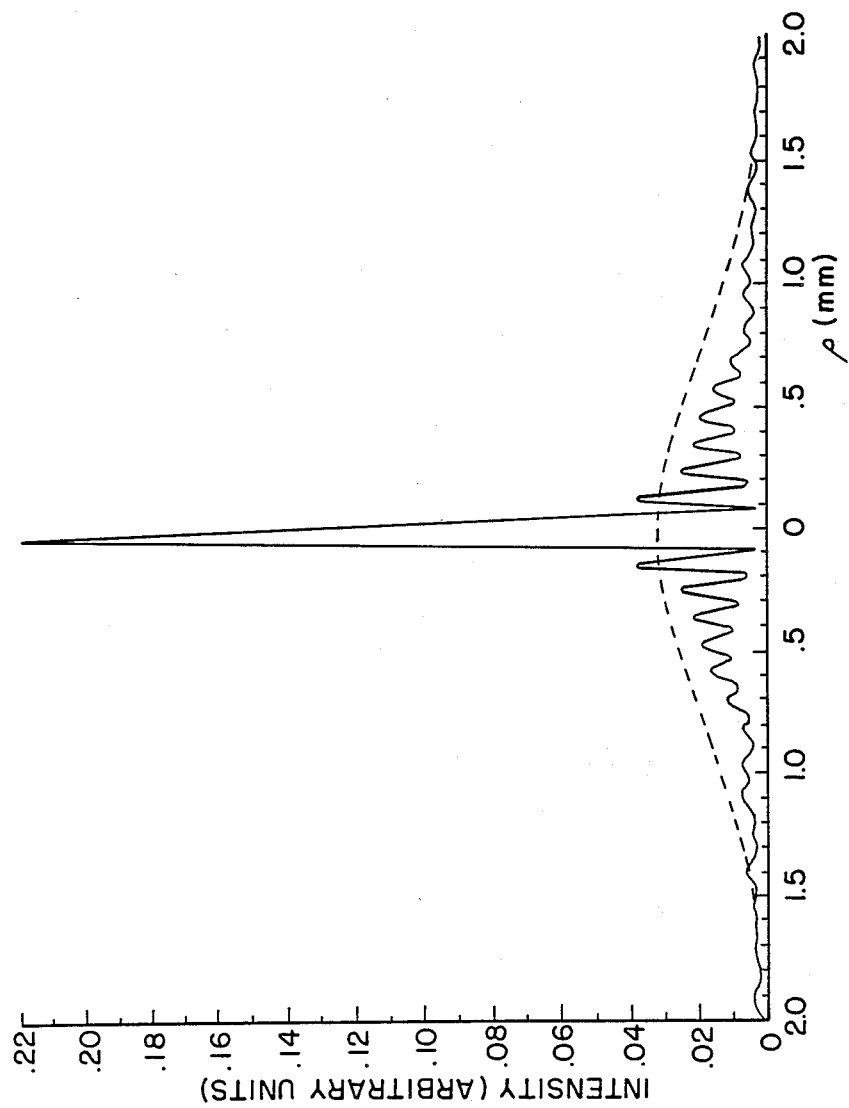

FIGS. 4a through 4f are graphical comparisons of the performance of an exemplary embodiment of a diffraction free aperture pursuant to the present invention compared with a Gaussian system. In FIGS. 4a through 4f, the solid line represents the intensity distribution for a $J_o$ beam produced pursuant to the teachings of the present invention, and the dotted line represents that of a Gaussian beam, in FIG. 4a when $z=0$ (i.e., in the initial plane where the beams are formed), in FIG. 4b after propagating a distance $z=25$ cm., in FIG. 4c after propagating a distance $z=50$ cm., and in FIG. 4d after propagating a distance $z=80$ cm., with $\lambda=0.5$ $\mu$m. In FIGS. 4b–d, the intensity of the Gaussian beam has been multiplied by 10 to make it visibly discernible.

Figure 5:
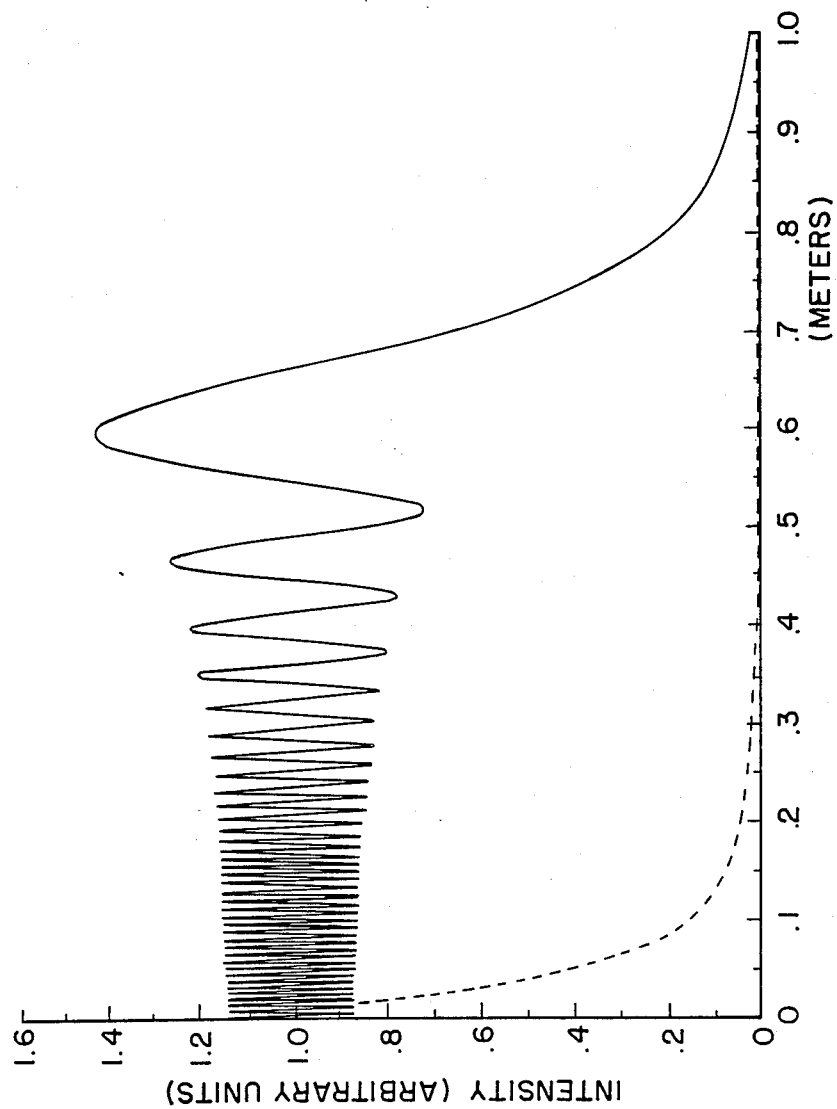
In FIG. 5, the solid and dotted lines again correspond to the $J_o$ and Gaussian beams whose initial intensity distributions at z=0 are shown in FIG. 4a, and FIG. 5 illustrates the intensity $I(\rho=0,z)$ at the beam center as a function of distance.

FIG. 5 illustrates the intensity $I(\rho=0,z)$ at the beam center as a function of distance of the $J_o$ and Gaussian beams, whose initial intensity distributions at $z=0$ are shown in FIG. 4a.

The intensity distribution $I(\rho,z=0)=J_0^2(\alpha\rho)$ when $\alpha=\pi\times 10^{-4}$ meters $^{-1}$ is shown in FIG. 4a. The central spot diameter is then 0.15 mm, and we assume that the field is zero for all $\rho>2$ mm. FIG. 4a also illustrates a dotted line which represents the intensity distribution of a Gaussian beam whose FWHM is 0.12 mm (the integrated energy is approximately 10 times less than that of the $J_o$ beam).

FIG. 5 is a numerical simulation of the propagation of the centra peak intensity (i.e., the intensity at $\rho=0$) for each beam as a function of distance from the aperture when the wavelength of each field is $\lambda=0.5$ $\mu$m. Since the initial energy is the $J_o$ beam is substantially greater than that of the Gaussian beam, it is not remarkable that the $J_o$ beam propagates a greater distance than the Gaussian. What is remarkable is that even as the peak intensity of the $J_o$ beam oscillates (in a manner reminiscent of the intensity distribution for the diffraction pattern near a straight edge), the central maximum of the intensity profile doesn't spread along the entire range of propagation, as demonstrated in FIGS. 4b–d. Such a beam would be very useful, for example, in performing high precision autocollimation or alignment.

There is a simple and accurate method for finding the range of a $J_o$ beam of finite aperture. One sees from equation (9) that the $J_o$ beam is a superposition of plane waves, all having the same amplitude and traveling at the same angle $\theta=\sin^{-1}(\alpha/\kappa)$ relative to the z-axis, but having different azimuthal angles ranging from 0 to $2\pi$. For such a field, geometrical optics preducts that a conical shadow zone begins at the distance $$z = r/\tan\theta \qquad (10)$$
$$= r[(\kappa/\alpha)^2 - 1]^{1/2},$$

where r is the radius of the aperture in which the $J_o$ beam is formed. For the case shown in FIG. 4a one finds that $\theta=0.143°$ and $z=80$ cm, which is a point located right at the base of the sharp decline in beam intensity shown in FIG. 5. In fact, equation (10) has been found to accurately predict the effective range of $J_o$ beams of finite aperture for values of $\alpha$ in the range $\alpha=\kappa$ (when there is no propagation) to $\alpha=2\pi/r$ (when the source field is essentially just a disc of radius r).

One method of creating a $J_o$ beam of finite aperture is by plane wave illumination of an object whose amplitude transmission function is equal to $J_o(\alpha\rho)$. This object would consist of a phase plate whose amplitude is $+1$ in those regions that $J_o(\alpha\rho)>0$ and $-1$ in those regions where $J_o(\alpha\rho)<0$, followed by a mask (e.g., photographic film) whose amplitude transmission is equal to $|J_o(\alpha\rho)|$. Another simple method consists of uniformly illuminating a circular slit located in the focal plane of a lens. In principle, each point on the circular slit acts as a point source which produces a plane wave propagation at an angle $\theta = \tan^{-1}(\xi/f)$, where $\xi$ is the radius of the slit and f is the focal length of the lens. If the incident light is of wavelength $\lambda$, the resulting $J_0$ beam will have a central spot diameter of $(3\lambda/4)[1+(f/\epsilon)^2]^{1/2}$.

Figure 6:
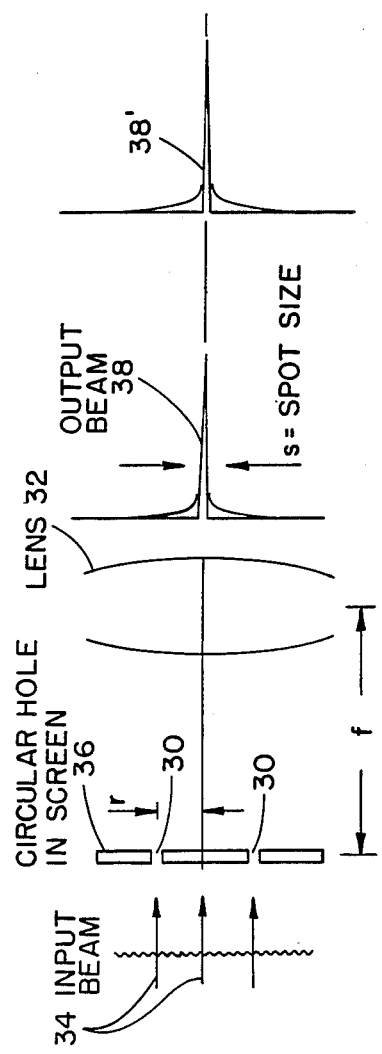
FIG. 6 illustrates a first embodiment of the present invention which is particularly applicable to optical waves, microwave and acoustical waves.

The embodiment of FIG. 6 generates a beam having a transverse dependence of a Bessel function by placing a circular annular source 30 of an input beam 34 in the focal plane of a lens focusing means 32, which results in the generation of a well defined beam thereby because the far field intensity pattern of an object is the Fourier transform thereof, and the Fourier transform of a Bessel function is a circular function. The arrangement of FIG. 6 forms the narrow beam 38 as predicted by the theory herein, which substantially retains its form at 38' unaffected by the normal spreading effects of diffraction.

The arrangement of FIG. 6 is generally applicable to embodiments with optical components, microwave components and acoustical components because of the commercial availability of the different components of the arrangement of FIG. 6 for those types of beams.

It has been shown, with reference to FIG. 6, that the sharp central spot size s is related to the radius r of the circular slit in the screen, the focal length f of the lens, and the wavelength $\lambda$ of the light beam by the simple formular $s = (3/4)(\lambda f/r)$.

Figure 7:
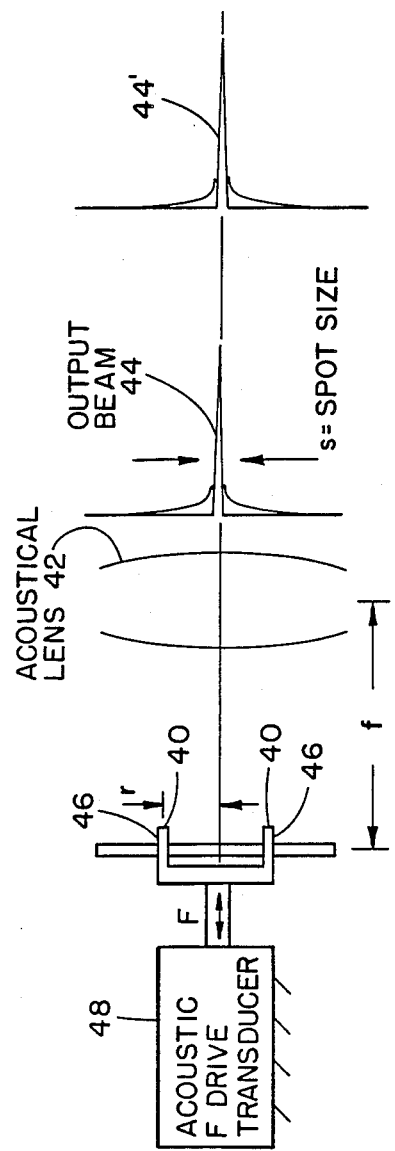
FIG. 7 is a schematic illustration of a second embodiment of the subject invention, analagous to the first embodiment of FIG. 6 but designated specifically for operation with acoustical waves.

FIG. 7 is a schematic illustration of a second embodiment of the subject invention, analogous to the first embodiment of FIG. 6 but designed specifically for operation with acoustical waves. In this embodiment, a circular annular source 40 of an acoustical beam is placed in the focal plane of an acoustic lens 42 to produce a narrow acoustical beam 44 as predicted by the theory herein which substantially retains its form at 44' unaffected by normal spreading effects of diffraction. The annular source 40 can be formed by a circular annular diaphragm 46 reciprocally driven at a selected acoustical frequency F by an acoustic drive transducer 48.

The acoustical lens 42 can ake any common form such as those described in *SOUND WAVES AND LIGHT WAVES*, by Winston E. Kock. This reference also describes several different types of microwave lenses which could operate in microwave embodiments analagous to the embodiments of FIGS. 6 and 7. The annular source of a microwave embodiment could be very similar to that illustrated in FIG. 6, with the screen 36 now being opaque to microwaves, such as by metal screen.

Figure 8:
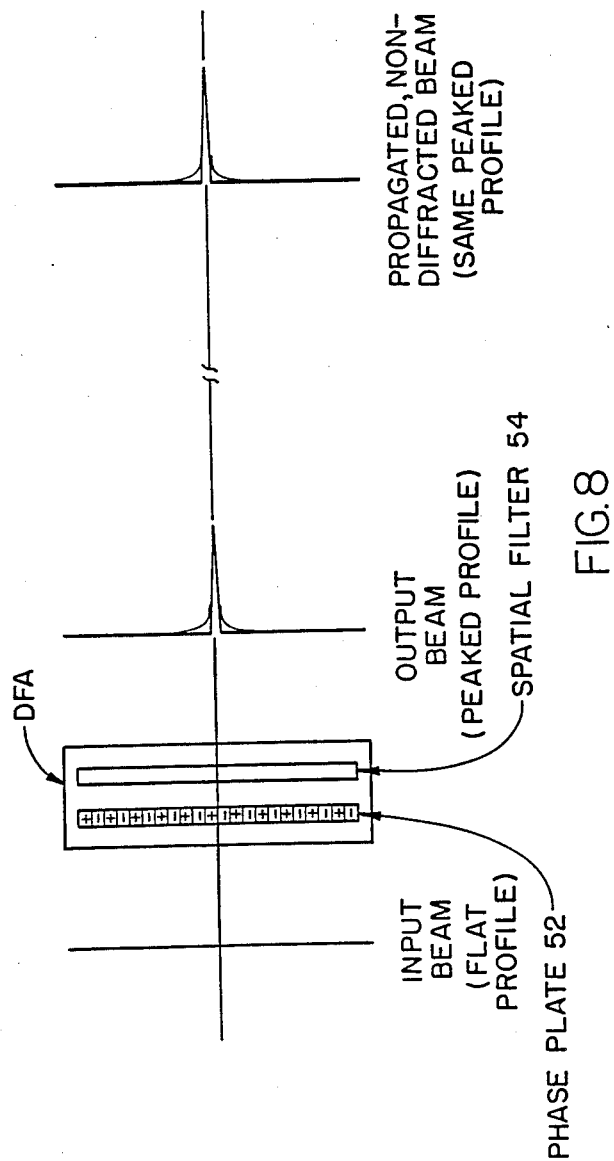
FIG. 8 illustrates a third embodiment of the present invention, particularly applicable to operation with microwaves.
Figure 9:
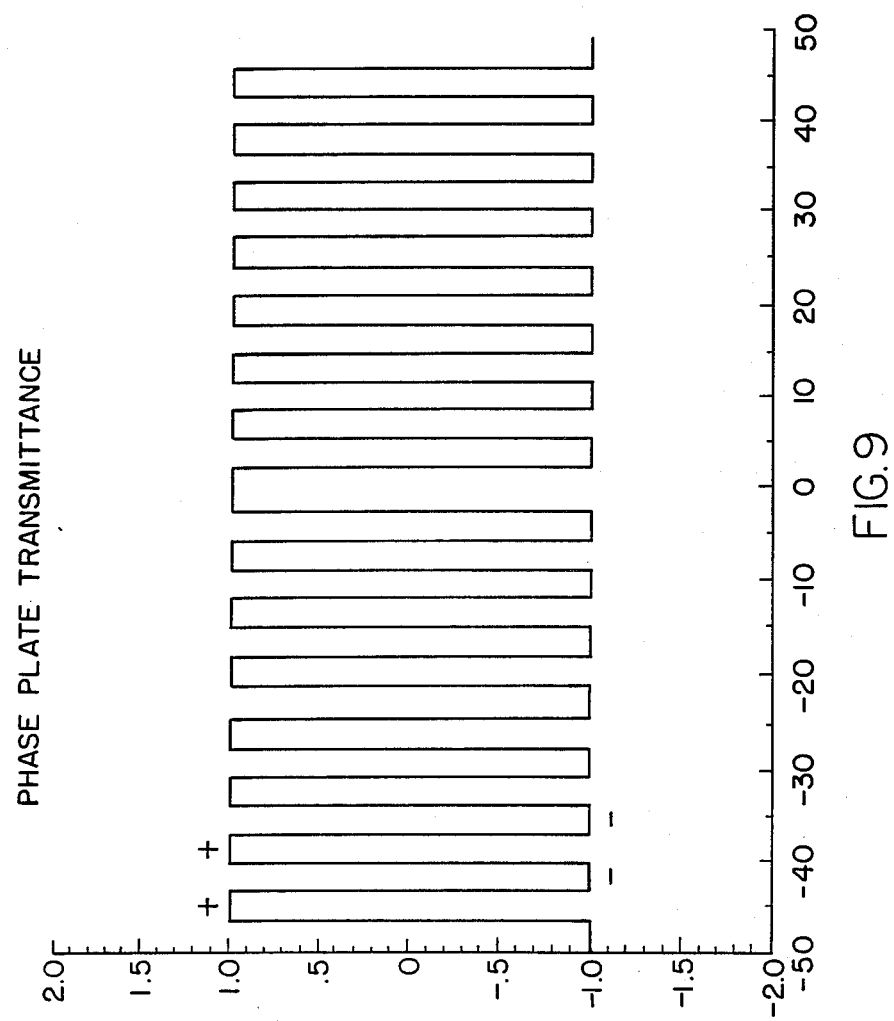
FIGS. 9, 10 and 11 illustrate respectively the phase plate transmittance, the spatial filter transmittance, and the output beam intensity of the third embodiment of FIG. 8.
Figure 10:
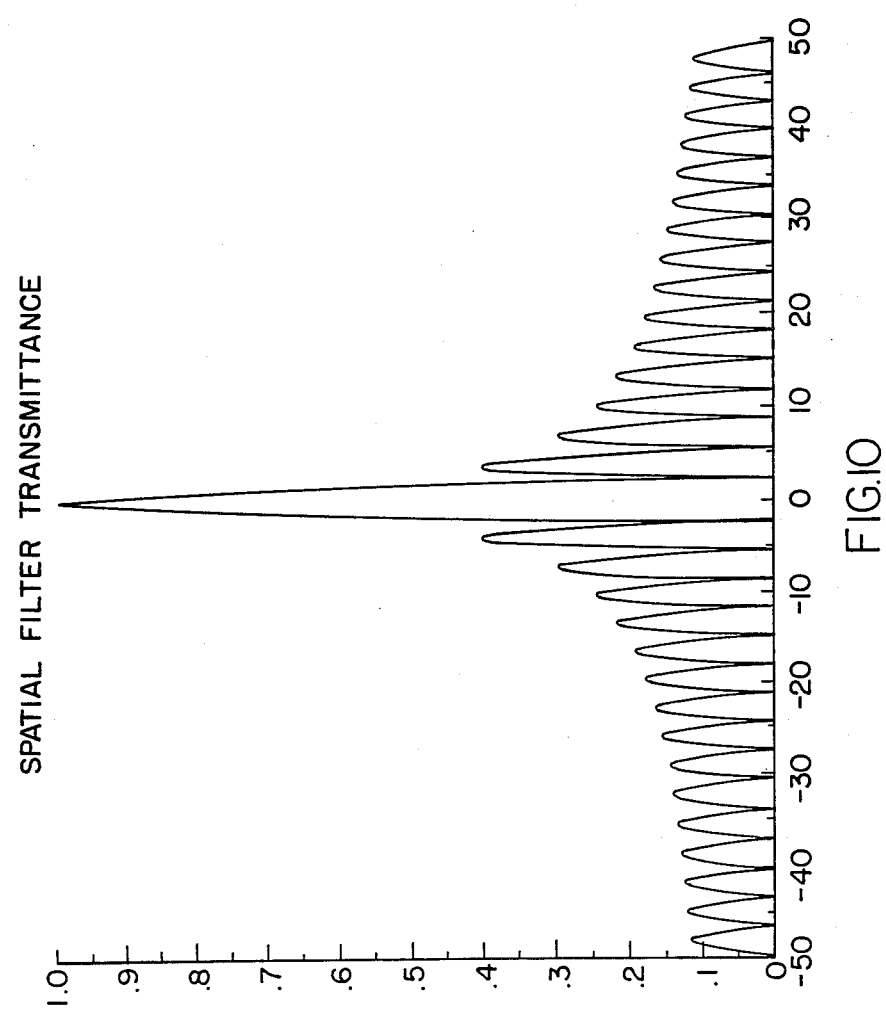
Figure 11:
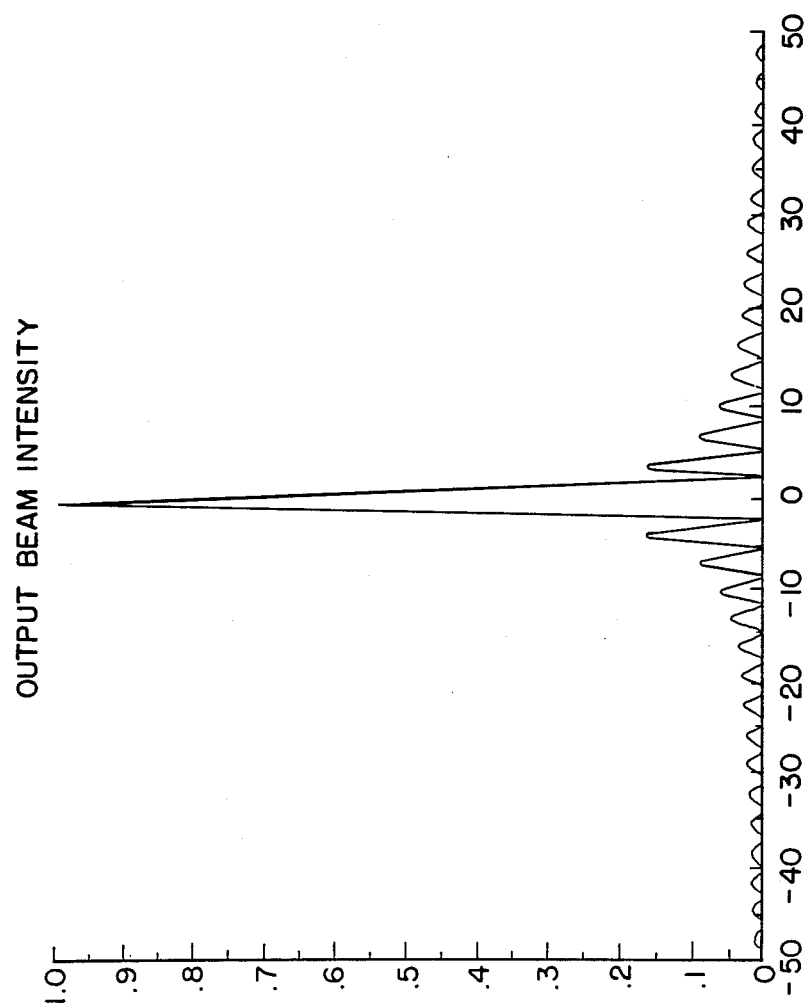

FIG. 8 illustrates a third embodiment of the present invention, particularly applicable to operation with microwaves, and FIGS. 9, 10 and 11 illustrate respectively the phase plate transmittance, the spatial filter transmittance, and the output beam intensity of the third embodiment of FIG. 8.

In microwave embodiments, the wavelength is not microscopic, but typically may be several centimeters (one inch = 2.54 cm). This size allows an array of a large number of phase shifters in a phase plate 52 to be coupled with an absorption filter 54, an shown schematically is FIG. 8. The absorption filter 54 is selected of elements whose degree of absorption is tailored to produce the overall size of the required Bessel modulation, while the phase shifters generate the negative portions of $J_0(\alpha\rho)$.

In this embodiment, the beam is generated by transmitting a coherent beam sequentially through a phase modulator, having a periodic step function pattern, and a spatial filter, whose transmittance is the modulus of the Bessel function, to generate a beam having a transverse Bessel function profile.

As illustrated in FIG. 9, the phase plate 52 can have a periodic step pattern which alternately transmits and blocks microwaves which is aligned with the spatial filter 54 having a microwave transmittance function as illustrated in FIG. 10. In a practical embodiment, the spatial filter 54 could be constructed by using a recording densitometer to record the function of FIG. 10.

A prototype diffraction free aperture has been constructed tested with commercially available optical equipment arranged as illustrated in FIG. 6, and its operation is substantially in agreement with the mathematical conclusions drawn from the Wave Equation and expressed herein.

While several embodiments and variations of the present invention for a diffraction free arrangement are described in detail herein, it should be apparent that the disclosure and teachings of the present invention will suggest many alternative designs to those skilled in the art.

What is claimed is:

1. A method for generating a well defined traveling wave beam not subject to beam spreading in the sense that the intensity pattern of the traveling wave beam in a transverse plane is substantially unaltered by propagation over a range which is substantially larger than the Rayleigh range of a Gaussian beam with equal central spot width, comprising, generating a traveling wave beam the amplitude of which has its transverse dependence substantially identical to $J_m(\alpha\rho)$, the $m^{th}$ Bessel function of the first kind, wherein $\alpha$ is a geometrical constant and $\rho$ designates the transverse radial coordinate of the wave, and further wherein the Bessel function argument is independent of the distance z of propagation, which results in a well defined traveling wave beam not subject to beam spreading.

2. A method for generating a well defined traveling wave beam not subject to beam spreading as claimed in claim 1, comprising generating the wave beam by placing a circular annular source of the wave beam in the focal plane of a focusing means, which results in the generation of the well defined wave beam by the focusing means because the far field intensity pattern of an object is the Fourier transform thereof, and the Fourier transform of a circular line function is the zero order Bessel function of the first kind.

3. A method for generating a well defined traveling wave beam not subject to beam spreading as claimed in claim 1, comprising generating the wave beam by transmitting a coherent wave beam sequentially through a phase modulator having a periodic step function pattern, and a spatial filter, whose transmittance is the modulus of the Bessel function of the first kind, to generate a wave beam having a transverse profile of a Bessel function of the first kind.

4. A method for generating a well defined traveling wave beam not subject to beam spreading as claimed in claim 1, 2, or 3, wherein said wave beam comprises an electromagnetic wave.

5. A method for generating a well defined traveling wave beam not subject to beam spreading as claimed in claim 1, 2, or 3, wherein said wave beam comprises a particle beam.

6. A method for generating a well defined traveling wave beam not subject to beam spreading as claimed in claim 1, 2, or 3, wherein said wave beam comprises a longitudinal wave.

7. A method for generating a well defined traveling wave beam not subject to beam spreading as claimed in claim 1, 2, or 3, wherein said wave beam comprises an acoustical wave.

8. A method for generating a well defined traveling wave beam not subject to beam spreading as claimed in claim 1, 2, or 3, wherein said wave beam comprises a transverse wave.

9. A method for generating a well defined traveling wave beam not subject to beam spreading as claimed in claim 1, 2, or 3, wherein said wave beam is generated with a transverse dependence of a zero order Bessel function of the first kind.

10. A system for generating a well defined traveling wave beam not subject to beam spreading in the sence that the intensity pattern of the traveling wave beam in a transverse plane is substantially unaltered by propagation over a range which is substantially larger than the Rayleigh range of a Gaussian beam with equal central spot width, comprising a circular annular source of the wave beam positioned in the focal plane of a focusing means, for generating a traveling wave beam the amplitude of which has its transverse dependence substantially identical to $J_m(\alpha\rho)$, the $m^{th}$ Bessel function of the first kind, wherein $\alpha$ is a geometrical constant and $\rho$ designates the transverse radial coordinate of the wave, and further wherein the Bessel function argument is independent of the distance z of propagation, which results in a well defined traveling beam not subject to beam spreading, because the far field intensity pattern of an object is the Fourier transform thereof, and the Fourier transform of the zero order Bessel function of the first kind is a circular line function.

11. A system for generating a well defined traveling wave beam not subject to beam spreading in the sense that the intensity pattern of the traveling wave beam in a transverse plaen is substantially unaltered by propagation over a range which is substantially larger than the Rayleigh range of a Gaussian beam with equal central spot width, comprising means for generating a coherent wave beam and passing it sequentially through a phase modulator having a periodic step function pattern, and a spatial filter, whose transmittance is the modulus of a Bessel function of the first kind for generating a wave beam having a transverse profile of a Bessel function of the first kind, the amplitude of which has its transverse dependence substantially identical to $J_m(\alpha\rho)$, the $m^{th}$ Bessel function of the first kind, wherein $\alpha$ is a geometrical constant and $\rho$ designates the transverse radial coordinate of the wave, and further wherein the Bessel function argument is independent of the distance z of propagation, which results in a well defined traveling wave beam not subject to beam spreading.

12. A system for generating a well defined traveling wave beam not subject to beam spreading as claimed in claim 10 or 11, wherein said wave beam comprises an electromagnetic wave.

13. A system for generating a well defined traveling wave beam not subject to beam spreading as claimed in claim 10, wherein said wave beam comprises a particle beam.

14. A system for generating a well defined traveling wave beam not subject to beam spreading as claimed in claim 10 or 11, wherein said wave beam comprises a transverse wave.

15. A system for generating a well defined traveling wave beam not subject to beam spreading as claimed in claim 12, wherein said wave beam is generated with a transverse dependence of a zero order Bessel function of the first kind.

* * * * *

UNITED STATES PATENT AND TRADEMARK OFFICE
CERTIFICATE OF CORRECTION

PATENT NO.   :   4,852,973

DATED        :   August 1, 1989

INVENTOR(S)  :   James E. Durnin, et al.

It is certified that error appears in the above-identified patent and that said Letters Patent is hereby corrected as shown below:

Column 2, line 3: "idendifies" should read as --identifies--

Column 2, line 55: "grows to miles" should read as --grows to 30 miles--

Column 3, line 55: "certan" should read as --certain--

Column 5, line 19: "designated" should read as --designed--

Column 8, line 21: "centra" should read as --central--

Column 8, line 24: "is the" should read as --in the--

Column 8, line 42: "preducts" should read as --predicts--

Columns 8-9, lines 68-1: "propagation" should read as --propagating--

UNITED STATES PATENT AND TRADEMARK OFFICE
CERTIFICATE OF CORRECTION

PATENT NO. : 4,852,973

DATED : August 1, 1989

INVENTOR(S) : James E. Durnin, et al.

It is certified that error appears in the above-identified patent and that said Letters Patent is hereby corrected as shown below:

Column 9, line 39: "ake" should read as --take--

Column 12, line 1, Claim 11: "plaen" should read as --plane--

Signed and Sealed this

Eighteenth Day of December, 1990

Attest:

HARRY F. MANBECK, JR.

Attesting Officer

Commissioner of Patents and Trademarks